May 25, 1943.   J. A. SOUTH   2,320,106
PURIFICATION OF OIL
Filed Aug. 7, 1940
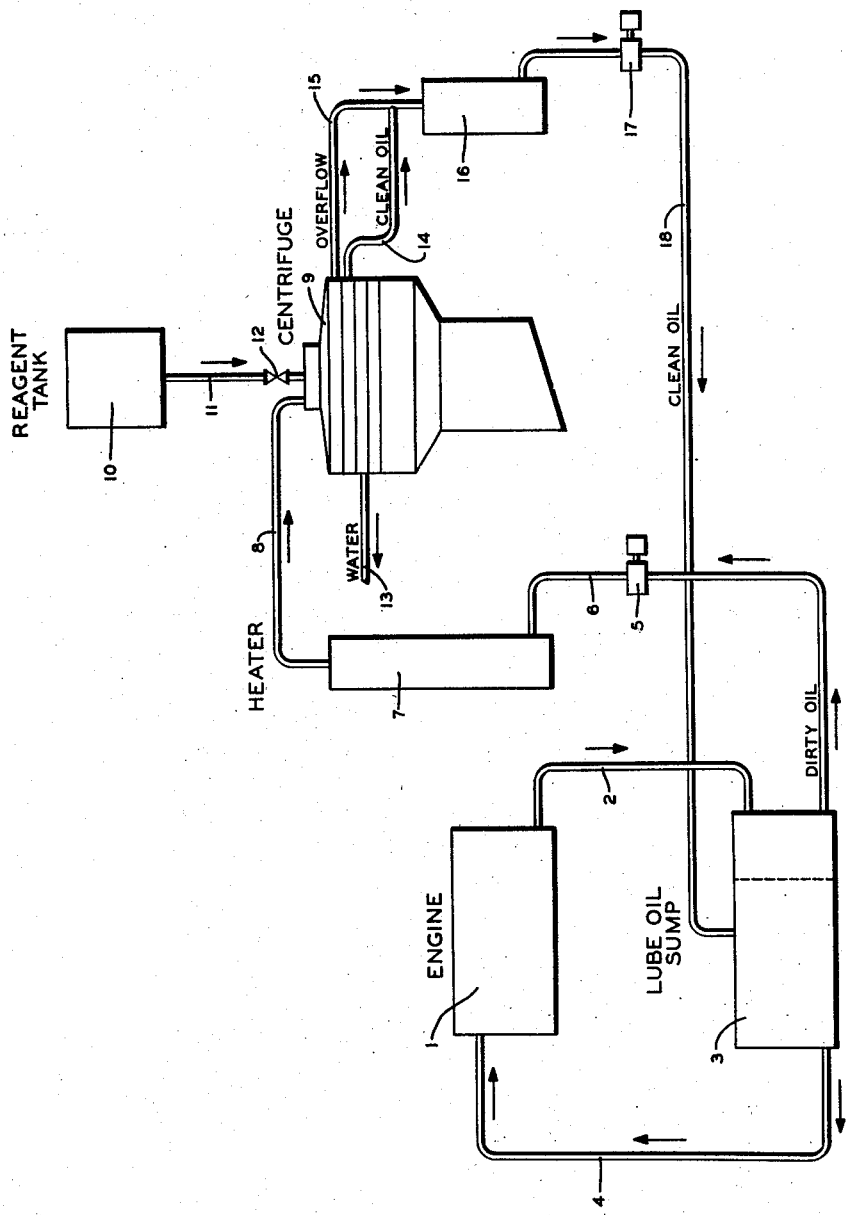
JOSEPH A. SOUTH
INVENTOR
BY RJ Dearborn
Daniel Stryker
HIS ATTORNEYS Patented May 25, 1943

2,320,106

UNITED STATES PATENT OFFICE 2,320,106

PURIFICATION OF OIL

Joseph A. South, Houston, Tex., assignor, by mesne assignments, to The Texas Company, New York, N. Y., a corporation of Delaware Application August 7, 1940, Serial No. 351,697

14 Claims. (Cl. 196—16)

This invention relates to the purification of oil, and more particularly it relates to a method of purifying lubricating oil which has been used in the lubrication of internal combustion engines, especially Diesel engines.

It is an object of this invention to provide a method of purifying used oil to substantially its original condition.

It is a further object to provide a method of maintaining lubricating oil in substantially its original condition by continuously or intermittently cycling part or all of the oil through a simple purification system.

It is a further object of the invention to provide an improved method of removing sludge, and other objectionable substances, from used lubricating oil by means of a new reagent comprising colloidal substances bearing an electrical charge opposite to that of colloidal sludge particles.

The term "sludge" is commonly applied to those contaminating substances in the lubricating oil which form a deposit of more or less solid nature in the lubricating system. This sludge may contain sand, dust, water, and other materials which may find their way into the lubricating system from outside sources. The sludge may also contain free carbon and carbonaceous solid, tarry, waxy, or gummy substances resulting from the lubricant itself by oxidation or other chemical reactions. The sludge may exist in three phases:

1. The solid phase, which includes solid particles which are retained in suspension in the oil only by agitation.

2. The colloidal phase, which includes particles which remain in suspension due to their small size, their electric charge, and the presence of stabilizing or dispersing agents.

3. The dissolved phase, which includes particles which are in true solution but which are potential sources of sludge and may be termed sludge-forming substances.

It is an object of the invention to effectively remove each of these three phases of sludge.

In addition to sludge and sludge-forming substances, the lubricating oil may be contaminated with certain low boiling substances which may include unburned fuel which enters the lubricating system or low boiling substances which are formed by decomposition of the lubricating oil. It is a further object of the invention to remove these low boiling substances, which lower the flash point of the oil and otherwise reduce the lubricating efficiency of the oil, by a simple treatment with a reagent followed by a separation of such as by means of a centrifuge.

Certain large internal combustion engines, such as Diesel engines, contain from 50 gallons up to as high as 3500 gallons of lubricating oil in the system, so that the maintenance of such large quantities of oil in a usable condition is a problem of economic importance. In such systems, it has become standard practice to remove suspended matter from the oil by means of a centrifuge. Although centrifuging removes a large proportion of the suspended matter from the oil, it has no effect upon colloidal sludge, dissolved sludge, and certain low boiling substances. The method of this invention is particularly concerned with centrifugal separation of sludge, etc., in which the centrifugal separation is aided by certain chemical reagents. However, the invention is not limited to processes involving centrifugal separation of sludge, but it includes processes in which sludge and other contaminants are removed from the oil by passing the oil through a filter containing the treating reagent, and it also includes purifying and reclaiming processes of the so-called "batch" type, wherein the reagent is added to a tank of used oil and the sludge is allowed to settle or is otherwise removed.

It has previously been suggested to precipitate sludge from lubricating oil by the addition of aqueous alkaline solutions which may or may not contain inorganic colloids. It has now been found that much superior results may be obtained by utilizing, as substances which aid the separation of sludge, certain organic colloids which bear a high negative electric charge. It is quite generally accepted that the sludge particles in lubricating oil are positively charged, and it has been previously inferred that the addition of negatively charged particles would result in neutralization of colloidal sludge particles and consequently would aid the separation of sludge. However, the substances which were previously suggested for this purpose were colloids bearing low negative charges so that they effected little removal of sludge by mutual precipitation, and the process could only be carried out effectively as a batch process since the precipitation was not rapid enough. By utilizing the negative organic colloids of this invention, substantially complete separation of dissolved and undissolved sludge is effected so rapidly that the method may be continuous, if desired.

The colloids which have been found to be particularly effective for the separation of sludge are organic colloids bearing a high negative charge, such as, for example, oleo-resins and gum resins containing a small proportion of a protective colloid such as water-soluble soaps, gum arabic, gum tragacanth, agar-agar, etc. The proportion of protective colloid may be of the order of about 4%, but it is to be understood that the proportion may vary, depending upon the particular protective colloid used and its efficiency in maintaining a stable aqueous emulsion or dispersion of the resin. A gum resin which has been found to be particularly suitable is olibanum, also known as gum thus and frankincense. Olibanum contains about 50 to 60% resin, 20 to 30% gum, and 3 to 7% volatile oils. Small proportions of a water-soluble soap or other protection colloid may be added to olibanum to make it more readily dispersible in water. A commercial product which contains oleo-resins or gum resins and a small proportion of a protective colloid, such as a water-soluble soap, is a product now sold under the name "Sand-Banum" by the American Sand-Banum Company, Inc., New York, N. Y. This commercial product has been found to be particularly effective in the purification of oil. These negative organic colloids are preferably dispersed in an alkaline solution containing such alkaline compounds as alkali metal hydroxides, for example, sodium hydroxide.

According to the invention any of the negative organic colloids discussed immediately above may be brought into contact with used oil in any suitable manner in order to effect the separation of sludge and other contaminants, for example, either in batch processes or in continuous processes. Continuous processes are preferred since such processes are particularly adapted for the maintenance of the oil in a lubricating system in a clean condition with the minimum of equipment and supervision. Batch processes may be required where the oil is very dirty and longer periods of contact of the treating reagent with the oil are necessary to effect the sludge separation.

In batch processes, the treating reagent, comprising negative organic colloids preferably dispersed in an aqueous alkaline medium, is added to used oil in a tank while agitating, the precipitated substances and reagent are allowed to settle into a layer at the bottom of the tank, and the purified oil is removed by drawing off the upper layer or is removed by similar methods. Aqueous dispersions containing from 0.1 to 1% of the negative colloid, and preferably also containing from 0.1 to 1% of an alkaline compound, such as sodium hydroxide, have been found to be very effective in the precipitation and separation of sludge and other contaminants in batch processes when added in the proportion of about 1 to 3% of the aqueous treating reagent, based on the weight of oil treated. For the purification or reclaiming of lubricating oil containing high proportions of contaminants, higher proportions of treating reagents are required, the proportion in each case being readily determined by trial. In order to obtain the most efficient separation of sludge, the process should be carried out at elevated temperatures, such as temperatures above 150° F., but the process may be carried out at lower temperatures, depending upon the viscosity of the oil.

Since the treating reagents of this invention induce rapid separation of sludge from the oil, they are particularly adapted for use in continuous purification processes involving the use of centrifuges or filters. For example, the negative organic colloids, as such, or dissolved or dispersed in a liquid medium, may be applied to the surface of a filtering material, such as cotton waste or the like, and the oil is passed through the filtering material, the sludge and other contaminants being retained in the filtering material. However, it is preferred to treat the oil by a continuous method involving the use of a centrifuge. In describing this preferred embodiment of the invention, reference is made to the accompanying drawing which represents diagrammatically an appparatus or method of flow which is particularly adapted for the purification of oil when utilizing the treating reagents described above.

Referring to the drawing, used lubricating oil is withdrawn from the engine 1, which may be a Diesel engine or other internal combustion engine which requires large volumes of lubricant, and the oil passes through the conduit 2 to the lubricating oil sump 3. A portion of the oil is returned to the engine by means of a conduit 4, and another portion of the oil is passed to the purification apparatus.

In purifying the oil, the dirty oil is withdrawn from the sump 3 by means of a pump 5 and passed through the conduit 6 to the heater 7, wherein it is heated to a temperature of the order of 150° F. and above, and preferably to a temperature of 180 to 190° F., in order to facilitate the purification process. Heating the oil to these temperatures aids the removal of sludge and other contaminants since it decreases the viscosity of the oil and also since the treating reagent acts more rapidly at higher temperatures. In some cases, the oil is heated sufficiently in the engine, but ordinarily further heating is desired in order to obtain the most efficient separation of impurities or contaminants from the oil. The heated oil passes through the conduit 8 to the centrifuge 9, which may be any conventional type operating at, for example, 6500–7500 revolutions per minute.

The treating reagent is made up in the reagent tank 10 by mixing a negatively charged colloid, for example, "Sand-Banum," with water in the proportions of about 0.1 to 1% "Sand Banum." It is preferred to add from about 0.1 to 1% of an alkaline compound, such as sodium hydroxide, to the treating reagent since the alkaline compound peptizes and disperses "Sand-Banum" and also since the alkaline compound neutralizes any acids contained in the oil. However, it is not necessary that the alkaline compound be added since aqueous dispersions of "Sand-Banum" are effective in themselves.

The treating reagent passes through the conduit 11 to the centrifuge 9, mixing with the oil at the top of the centrifuge, and the rate of flow of reagent is adjusted by means of the valve 12, according to the amount of sludge and other contaminants present in the oil to be treated.

The treating reagent and used lubricating oil are effectively mixed in the centrifuge so that every portion of the oil is affected by the treating reagent. While prior purification processes required considerable time of contact of the treating reagent with the oil, it has been found that the treating reagent of this invention need be contacted with the oil only during the short period of time required for the oil to pass through the centrifuge. Sludge and other contaminants are retained in the centrifuge, and are removed by periodic cleaning by manual or other means. The aqueous treating reagent is ordinarily retained in the centrifuge with the sludge, but if the oil contains only a small amount of sludge, an aqueous phase containing treating reagent may be discharged through the spout 13. The purified oil is discharged through the line 14 to the container 16, from which it is passed to the sump 3 through the conduit 18 by means of the pump 17. If lubricating oil is fed too rapidly to the centrifuge or if flow through the centrifuge is impeded, such as by the presence of too much sludge in the centrifuge, the excess liquid passes through the overflow 15 to the container 16, from which it is returned to the sump.

While it is preferred to add the treating reagent to the stream of oil as it enters the centrifuge, it may be added to the oil at other points in the system, such as any point in the feed line, between the sump 3 and the centrifuge, it being essential only that the treating agent be present during the agitation and separation which occur within the centrifuge.

In the lubrication of a 150 horsepower, horizontal, single cycle, Snow-Diesel engine whose lubricating system contains about 75 gallons of oil, it has been found that the oil may be maintained in substantially its original, clean condition by feeding the oil to a De Laval centrifuge (360 type) at the rate of about 75 gallons per hour, and feeding the treating reagent at the rate of about one quart per hour, the concentration of "Sand-Banum" in the reagent being about 0.1 to 1% and the concentration of sodium hydroxide in the reagent being about 0.1 to 1%. Under such conditions, about three to four hours of centrifuging per week of continuous operation of the Diesel engine are required, that is, all of the oil is passed through the centrifuge three to four times per week of engine operation. If the lubricating oil contains large amounts of sludge at the beginning of the purification process, the oil should be continuously treated until the system is clean, and then the oil is passed through the centrifuge three to four times per week of engine operation, in the case of the Snow type of engine. If the sodium hydroxide is omitted from the treating reagent, somewhat longer periods of centrifuging are required, as the rate of sludge removal is slower. However, aqueous dispersions of "Sand-Banum" alone are much more effective than aqueous alkaline solutions which contain no negative organic colloid, and this fact shows that the primary sludge-precipitating agent is the "Sand-Banum," the sodium hydroxide merely serving to increase the effectiveness of the "Sand-Banum." It is thought that such substances as sodium hydroxide increase the negative charge on the "Sand-Banum" so that it is possible to neutralize and precipitate more of the sludge particles.

A typical analysis of the sludge removed by the method of this invention is as follows:

| | Per cent by weight |
|---|---|
| Water | 48.8 |
| Volatile matter at 250° F., except water | 3.8 |
| Lubricating oil (soluble in naphtha) | 4.2 |
| Tarry matter (soluble in benzene) | 3.5 |
| Carbonaceous matter (by difference) | 36.1 |
| Ash | 3.6 |

This analysis shows that a substantial proportion of low boiling substances are removed by the use of treating reagents containing negative colloids of the type represented by "Sand-Banum." The removal of low boiling substances results in a material increase in the flash point of the oil. For example, in one instance, the flash point of the oil was raised from 380° F. to 415° F., representing an increase of flash point of 35° F. In prior processes, these low boiling substances could be removed only by distillation or similar methods involving the use of more complicated apparatus than the simple apparatus of this invention.

It has also been found that negative colloids of the type of "Sand-Banum" reduce the corrosive sulphur content of the oil.

In the specific example, the size of the centrifuge was such that the oil was maintained in good condition by only three to four passages through the centrifuge per week of engine operation. In the case of larger engines, six to eight passages of the entire volume of oil through the centrifuge are required per week of engine operation, and certain extreme conditions necessitate as high as twelve passages of the oil through the centrifuge per week of engine operation. In view of the efficiency of the process, much smaller centrifuges may be utilized, thus resulting in a saving in the cost of equipment. With the smaller centrifuges, longer periods of operation are required, and the size of the centrifuge may be chosen such that it may be operated continuously, except for periodic shut-downs for cleaning.

Obviously, many modifications and variations of the invention as hereinbefore set forth may be made without departing from the spirit and scope thereof, and therefore only such limitations should be imposed as are indicated in the appended claims.

I claim:

1. The method of purifying used oil which comprises contacting the oil with a treating reagent containing a substance of the group consisting of oleo-resins and gum resins, and separating sludge, other contaminants, and treating reagent from the oil.

2. The method of claim 1 in which the treating reagent is carried on a filtering material and the sludge, other contaminants, and treating reagent are retained in the filtering material.

3. The method of purifying used oil which comprises heating the oil, adding an aqueous treating reagent comprising a dispersion of a substance from the group consisting of gum resins and oleo-resins, and separating the aqueous phase containing sludge, other contaminants, and treating reagent.

4. The method of claim 3 in which the treating reagent contains olibanum.

5. The method of claim 3 in which the treating reagent contains "Sand-Banum."

6. The continuous method of purifying used oil which comprises heating the oil to a temperature above about 150° F., adding to the heated oil an aqueous treating reagent comprising a dispersion of a negative colloid from the group consisting of gum resins and oleo-resins, and separating the sludge, other contaminants, and treating reagent from the oil by centrifuging.

7. The method of claim 6 in which the negative colloid contains a protective colloid.

8. The method of claim 6 in which the treating reagent contains olibanum.

9. The method of claim 6 in which the treating reagent contains olibanum and a small proportion of an alkaline compound.

10. The method of claim 6 in which the treating reagent contains "Sand-Banum."

11. The method of claim 6 in which the treating reagent contains "Sand-Banum" and a small proportion of an alkaline compound.

12. In a process in which the lubricating oil supply of an internal combustion engine is maintained in purified condition by subjecting a portion of said supply to a purification treatment during operation of the engine and returning the resulting purified portion to the said supply for recirculation to the engine, the improvement which comprises effecting the purification treatment by contacting said oil, at an elevated temperature, with a treating agent containing a substance of the group consisting of oleo-resins and gum resins, and centrifuging the resulting mixture to separate purified oil from excess treating reagent and sludge formed by said treatment.

13. The method of claim 12, in which the treating reagent contains olibanum.

14. The method of claim 12, in which the treating reagent contains "Sand-Banum."

JOSEPH A. SOUTH.